Aug. 16, 1966    C. M. DREW    3,266,118
CRANKSHAFT
Filed Aug. 15, 1963    3 Sheets-Sheet 1

INVENTOR.
Christopher M. Drew,
BY
Byron, Hume, Groen & Clement
Attorneys.

Aug. 16, 1966
C. M. DREW
3,266,118
CRANKSHAFT
Filed Aug. 15, 1963
3 Sheets-Sheet 2
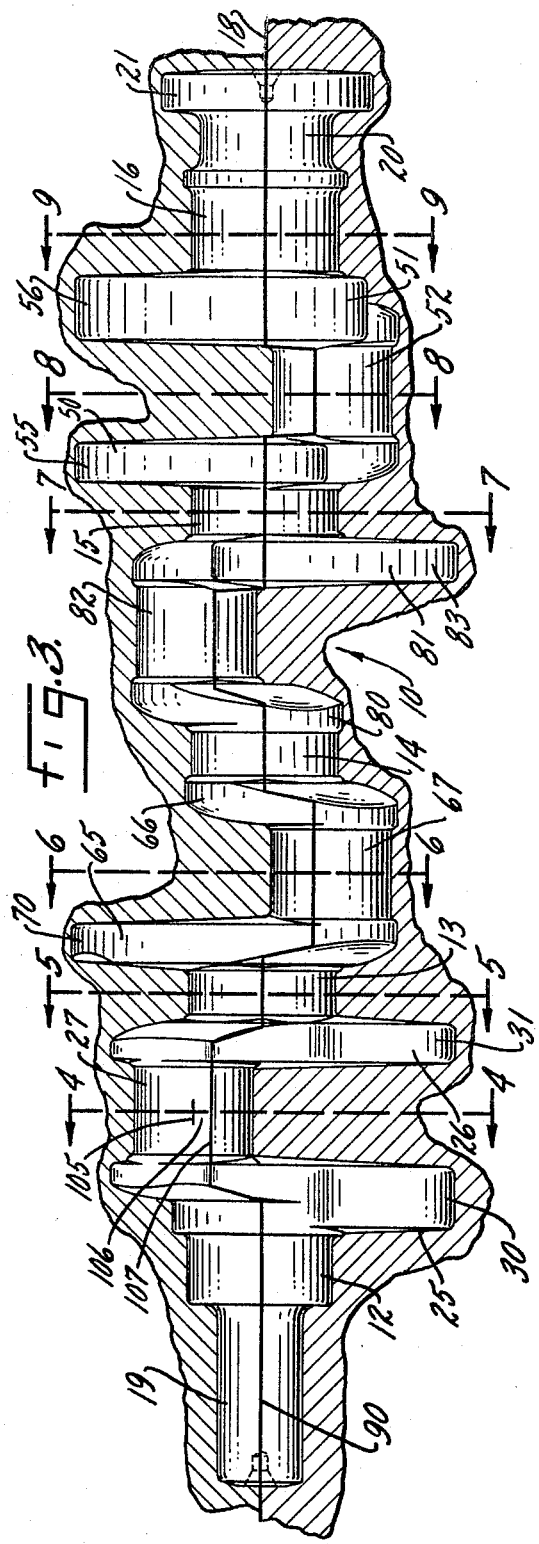
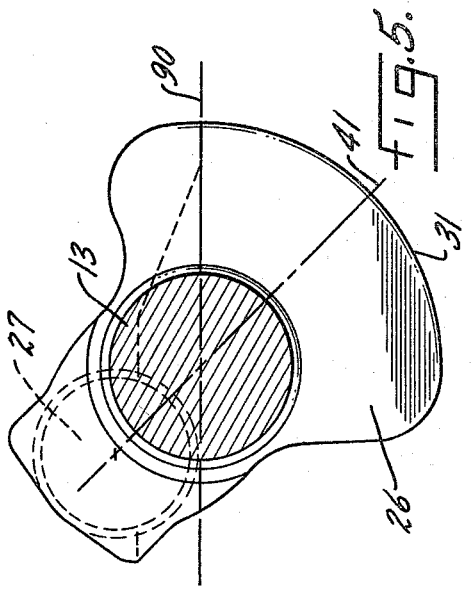
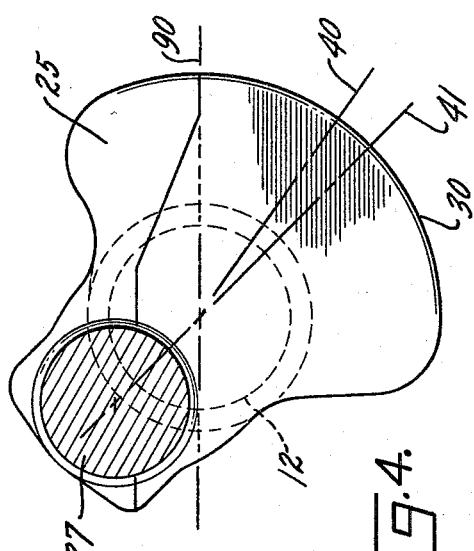
INVENTOR.
Christopher M. Drew,
BY
Byron, Hume, Groen & Clement
Attorneys.

Aug. 16, 1966   C. M. DREW   3,266,118
CRANKSHAFT
Filed Aug. 15, 1963   3 Sheets-Sheet 3
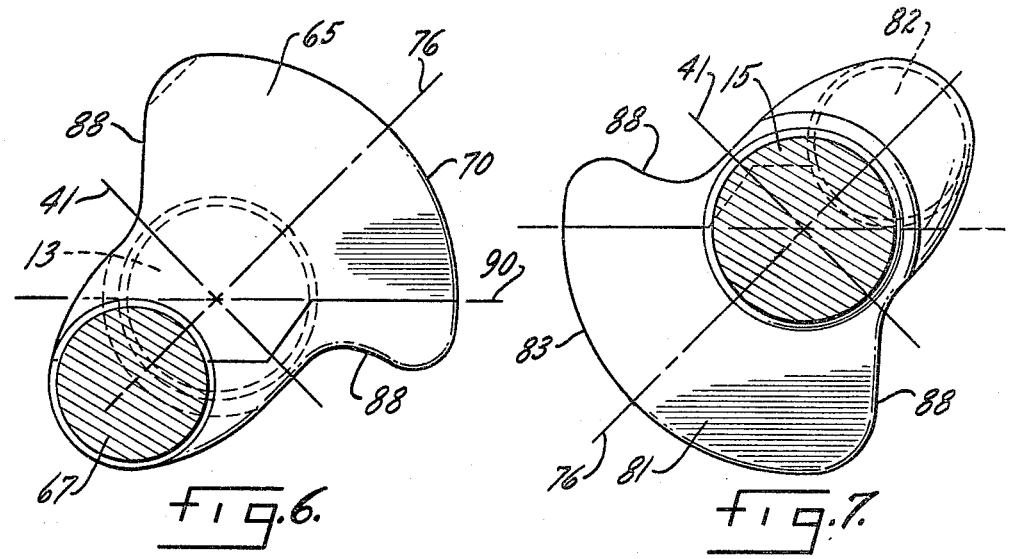
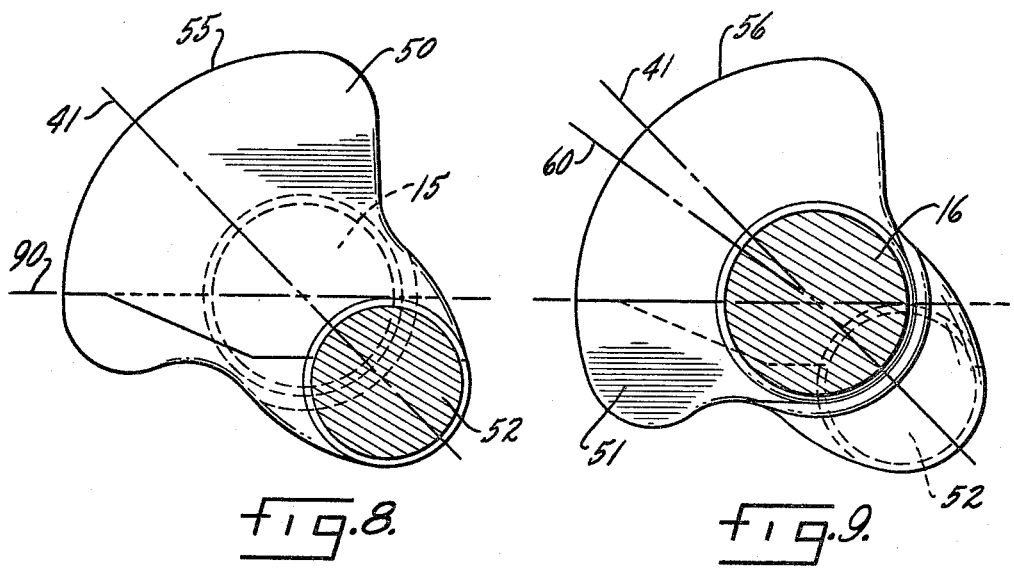
INVENTOR.
Christopher M. Drew,
BY
Byron, Hume, Groen & Clement
Attorneys.

United States Patent Office 3,266,118
Patented August 16, 1966

3,266,118
CRANKSHAFT
Christopher M. Drew, Hazel Crest, Ill., assignor to Wyman-Gordon Company, Worcester, Mass., a corporation of Massachusetts
Filed Aug. 15, 1963, Ser. No. 302,432
5 Claims. (Cl. 29—6)

This invention relates in general to crankshafts and more particularly to a new and improved method of forging dynamically balanced crankshafts in place. It deals specifically with an in place forging method and die arrangement for ninety degree displaced throw crankshafts.

The usual V–8 engine utilizes a ninety degree displaced, four throw crankshaft, as is well known. With such a crankshaft, the four crank pins on the shaft are angularly displaced ninety degrees from each other about the axis of rotation of the shaft. When the shaft is rotated, the rotation of diametrically opposed pairs of the crank throws produce rotating couples in the crankshaft. Since these couples cause engine roughness, and high bearing loads, with concomitant wear and a high order of bearing failure, the crankshaft is conventionally counter weighted to dynamically balance it.

Various methods have been worked out for advantageously counter weighting a crankshaft to balance the couples which tend to alter the axis of rotation of the shaft and, at the same time, bend it. Since the shaft is essentially a rigid member, the primary requirement is that of balancing the resultant forces tending to alter the axis of rotation of the shaft and bring heavy loads to bear on the main bearings. Accordingly, any calculations designed to provide information for counter weighting a shaft necessarily provide for an arrangement, including size and contour, which suitably satisfies this requirement.

As to the bending effect of the couples, a slightly different outlook prevails. The effect is felt primarily at intermediate bearings and is not substantial since the shaft is essentially rigid, as has been pointed out. To avoid as much intermediate bearing wear as possible, the object is merely to come as close to a perfectly balanced state at the intermediate bearings as possible and still be compatible with weight and size limitations as well as manufacturing methods.

It has long been common practice to forge crankshafts in a single plane, as is well known. In other words, form the crank pins all in the same plane with the axis of rotation of the shaft. Subsequently, the shaft is appropriately twisted to move the crank pins and counter weights into proper relationship. This is an advantageous method in that virtually any desired shape and size counter weight can readily be formed without difficulty and subsequently twisted into proper position along with the corresponding crank pin. However, as will readily be understood, this method requires an additional step in the crankshaft forming operation and is undesirable for this, as well as other reasons; loss of dimensional accuracy, for example.

As an exemplary alternative, forging crankshafts in place has been practiced in the past ten years or so, as illustrated by the disclosure in the Turlay Patent No. 3,045,507, for example. This method, which consists of forging one set of opposing crank pins in a horizontal plane (the die parting plane) and the other set of opposed crank pins in a vertical plane with the axis of crankshaft rotation (and is hereinafter referred to as the Turlay method), eliminates the twisting step, of course. Unfortunately, the elimination of certain drawbacks merely introduces others.

For example, the most desirable counter weight contours, sizes, and arrangements for most crankshafts are not available because of draft requirements for die parting. Accordingly, less desirable contours, sizes, and arrangements must be utilized for the counter weights and attempts to provide more attractive angular arrangement or contour, for example, only necessitates more draft material on their sides and contours. The additional weight in the rough forging and in the finished crankshaft results in substantially higher direct and indirect (cheeking tool wear) costs, of course.

In addition, deep intermediate die cavities are necessitated by the maximum vertical displacement of the numbers two and three crank pins from the parting plane. As a result the die sections between the deep cavities are substantially weaker than the remainder of the die parts and more prone to failure. Furthermore, a substantially increased energy output is required to fill the cavities; plus the fact that the resultant amount of flash material requiring removal is substantially greater.

An additional problem is encountered in the die lock arrangement. It has been found, of course, that die locks are required adjacent the raised die sections at the numbers two and three crank pins when a crankshaft is forged in place, to precisely mate the die parts. Where the crankshaft is forged in place by the Turlay method, for example, these die locks must be relatively deep and, accordingly, are somewhat insubstantial and tend to deform in a short time. Furthermore, the high male lock portions have a tendency to overheat at their extremities because heat cannot dissipate easily to the body of the die. This hastens deformation and erosion.

Accordingly, it is an object of the present invention to provide a new and improved method of forging ninety degree displaced throw crankshafts.

It is another object to provide a new and improved method of forging ninety degree displaced throw crankshafts in place.

It is still another object to provide a method of the aforedescribed character for forging a ninety degree displaced throw crankshaft with virtually any desirable counter weight contours, sizes, and arrangements.

It is yet another object to provide a method of forging crankshafts in place wherein highly desirable counter weight contours and arrangements are accommodated, yet wherein the counter weights require a minimum of draft material on their sides and contours.

It is a further object to provide a method of the aforedescribed character which assures a relatively long die life.

It is yet a further object to provide a method of the aforedescribed character wherein relatively less die closing energy is required than with in place forging methods heretofore utilized.

It is still a further object to provide a method of the aforedescribed character wherein substantially less metal flash loss is realized in the forging operation.

It is another object to provide an improved die arrangement for in place forging of ninety degree displaced throw crankshafts.

The foregoing and other objects are realized in accordance with the present invention by providing a new and improved forging method and die arrangement for a ninety degree displaced, multiple throw crankshaft. The invention contemplates a method of forging such a crankshaft in place while employing an optimum counter balance arrangement, including the most desirable size and contour counter weights, as well as similarly desirable angular relationships.

The method consists of forging a crankshaft with the planes of each of the ninety degree displaced throws angularly off-set from the parting plane of the forging dies. The amount of angular displacement might vary somewhat dependent upon variations in crankshaft design dictated by individual engine requirements. However, it usually lies between twenty degrees and fifty degrees for one opposing set of throws and, accordingly, between seventy degrees and forty degrees for the other opposing set of throws. It has been found that a thirty-five degree displacement of the closest set of throws to the parting plane is an average optimum, for example.

The invention is illustrated more or less diagrammatically in the following drawings wherein:

FIGURE 3 is a side-elevational view of a crankshaft eminently suitable for forging in place by the present method, but unsuitable for forging in place by the Turlay method, for example, between two die sections;

FIGURE 4 is a sectional view taken along line 4—4 of FIGURE 3;

FIGURE 5 is a sectional view taken along line 5—5 of FIGURE 3;

FIGURE 6 is a sectional view taken along line 6—6 of FIGURE 3;

FIGURE 7 is a sectional view taken along line 7—7 of FIGURE 3;

FIGURE 8 is a sectional view taken along line 8—8 of FIGURE 3; and

FIGURE 9 is a sectional view taken along line 9—9 of FIGURE 3.

Figure 1:
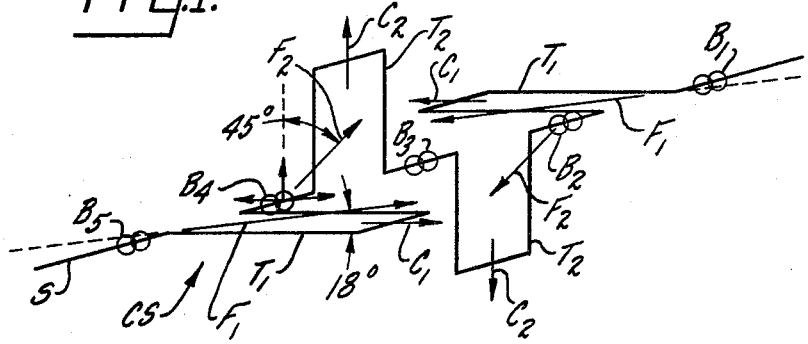
FIGURE 1 is a diagrammatic perspective view of the shaft, throws, and bearing arrangements in a ninety degree displaced, four throw crankshaft.
Figure 2:
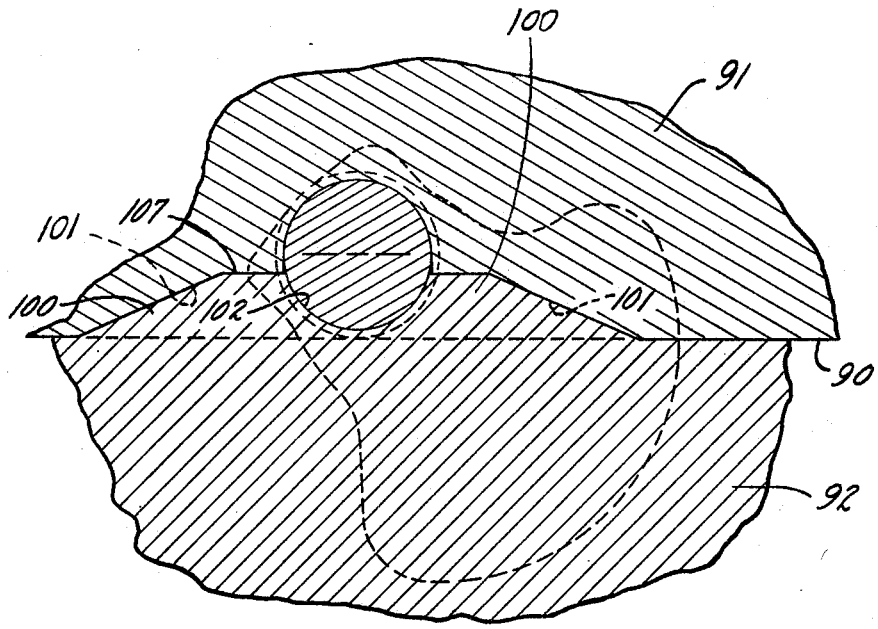
FIGURE 2 is a sectional view through the crankshaft illustrated in FIGURE 3, shown in forging position between die sections.

To more specifically appreciate the problems attendant to forming a dynamically balanced, ninety degree displaced, four throw crank, reference is made to the drawings and particularly to FIGURE 1. Here a basically standard ninety degree displaced, four throw crankshaft is illustrated diagrammatically at CS. The crankshaft CS includes a shaft S which carries four crank throws T and a series of five bearings $B_1$–$B_5$. The throws T rotate about the axis of the shaft S under the influence of driving pistons (not shown), of course.

As the shaft S rotates, couples are set up in the directions of the arrows $C_1$ and $C_2$ by the opposed sets of throws $T_1$ and $T_2$, respectively, in a well-known manner. Recognizing that the shaft S is essentially a rigid body, the primary effect of these couples is to introduce resultant force vectors at the outer or main bearings $B_1$ and $B_5$. The outer throws $T_1$ are more widely spaced than the inner throws $T_2$, so the outer couple $C_1$ has a greater unbalancing effect than $C_2$. The resultant unbalancing force vectors $F_1$ introduced at the main bearings $B_1$ and $B_5$ are conventionally in the neighborhood of about eighteen degrees displaced from the plane of the throws $T_1$, as illustrated.

It is these unbalancing force vectors $F_1$ acting on the main bearings $B_1$ and $B_5$ which must be balanced to prevent engine vibration and excessive main bearing wear. Accordingly, the shaft S is conventionally provided with there counter weights adjacent the bearings $B_1$ and $B_2$, and three counter weights adjacent to $B_4$ and $B_5$, the counter weights acting together one hundred eighty degrees from the force vectors $F_1$. This arrangement provides the necessary balance of the shaft S at the main bearings, and would appear to solve the entire counter balancing problem if the shaft S is completely rigid. However, practically speaking, the couples $C_1$ and $C_2$ do introduce loads at the intermediate bearings which, without modifying the counter weighting, would produce excessive intermediate bearing wear, because the shaft S is not *perfectly* rigid.

As further illustrated in FIGURE 1, the couples $C_1$ and $C_2$ produce resultant force vectors $F_2$ at the bearings $B_2$ and $B_4$. The force vectors $F_2$ act at an angle of approximately forty-five degrees to the plane of the throw $T_2$, as illustrated, in the same quadrants as the force vectors $F_1$. Accordingly, counter weights are disposed adjacent the intermediate bearings $B_2$ and $B_4$ in an attempt to reduce intermediate bearing load by acting in opposition to the force vectors $F_2$.

The optimum intermediate counter weight arrangement is one wherein the weights are angularly positioned and contoured to act so that their combined effect is essentially opposite to the force vectors $F_2$ since the outer counter weights are more effective in counter balancing the force $F_1$, and are therefore oriented close to the plane of $F_1$, the inner counter weights are frequently oriented beyond the plane containing $F_2$ so that the combined effect of the intermediate counter weights lies close to the forty-five degree plane of $F_2$. However, accommodations are frequently made in intermediate counter weight positioning and contour to permit the use of certain crankshaft forming techniques. Such is the case with the Turlay method of forging a ninety degree displaced four throw crankshaft.

Attendant to forging a crankshaft in place by the Turlay method is the severe limitation placed on counter weighting at the intermediate bearings. For example, the intermediate counter weights on a shaft forged by this method cannot be angularly displaced from the parting plane a sufficient distance to balance the intermediate force vectors $F_2$ without using undesirably large weights because of the draft considerations in die parting. There are other disadvantages to the Turlay method but they have been previously pointed out in sufficient detail. Accordingly, they are not reiterated here.

The present invention embodies a forgoing method which obviates the disadvantages of forging in a single plane and twisting on one hand, and simulataneously obviates the disadvantages of forging in place as it has heretofore been carried out. Referring to FIGURES 2–9, one of a number of exemplary ninety degree displaced, four throw crankshafts having optimum counter weight contours, sizes, and arrangements, is illustrated at 10. The crankshaft 10 can readily be forged in place by the present method but cannot be forged in place by the Turlay method, for example.

The crankshaft 10 is a standard V–8 crankshaft for one of the later model automobile engines. It includes a front main bearing 12, three intermediate bearings, 13–15, and a rear main bearing 16 formed on an axis 18. A front shaft extension 19 provides means for mounting a cooling fan or the like and a rear shaft extension 20 and flange 21 provides means for connecting the driven components of the engine (not shown) to the shaft 10.

The front main bearing 12 and the intermediate bearing 13 are formed integrally with and bracketing a pair of crank cheeks 25 and 26 which support the number one crank pin 27 and define the number one crank throw. Fan shaped counter weights 30 and 31 are formed of the cheeks 25 and 26, respectively, opposite the axis 18 from the pin 27. The contour, size, and angular arrangement of the counter weights 30 and 31 are such that they direct a force vector along a line 40 displaced in the neighborhood of about ten degrees from the plane 41 of the number one crank throw.

The rear main bearing 16 and the intermediate bearing 15 are formed integrally with and bracket a pair of crank cheeks 50 and 51 which support the number four crank pin 52 and define the number four crank throw. Fan shaped counter weights 55 and 56 are formed of the cheeks 50 and 51, respectively, opposite the axis 18 from the crank pin 52. The contour, size, and angular arrangements of the counter weights 55 and 56 are such that they direct a force vector along the line 60 displaced in the neighborhood of about ten degrees from the plane 41 of both the number one and number four crank throws. Taking into consideration the intermediate bearing counter weighting, this arrangement assures that the shaft 10 is counter weighted adjacent the main bearings 12 and 16 essentially in accordance with the theory set out in relation to the crankshaft CS illustrated in FIGURE 1 and hereinbefore described.

The intermediate bearings 13 and 14 are formed integrally with and bracketing a pair of crank cheeks 65 and 66 which support the number two crank pin 67 and define the number two crank throw. A single fan shaped counter weight 70 is formed of the cheeks 65 opposite the axis 18 from the pin 67. The contour, size, and angular relationship of the counter weight 70 is such that it directs a force vector substantially in the plane 76 of the number two crank throw.

The intermediate bearings 14 and 15 are formed integrally with and bracketing a pair of crank cheeks 80 and 81 which support the number three crank pin 82 and define the number three crank throw. A fan shaped counter weight 83 is formed of the cheek 80 opposite the axis 18 from the pin 82. The contour, size, and angular relationship of the counter weight 83 is such that it directs a force vector placed substantially in the plane 76 of the number two and number three crank throws.

The result is that the intermediate counter weights 70 and 83, combined with the effect of counter weights 31 and 55, direct force vectors substantially in accordance with the theory espoused in relation to the diagrammatic crankshaft CS illustrated in FIGURE 1 and hereinbefore discussed. Looking at the entire shaft 10 now, the plane 76 along which the counter weight 70 directs a force vector lies in the same quadrant but about eightly degrees displaced from the radial 40 along which the counter weights 30 and 31 direct force vectors. In the same light, the plane 76 (along which the counter weight 81 also directs a force vector) lies in the same quadrant but about eighty degrees displaced from the radial 60 along which the counter weights 55 and 56 direct a force vector.

In view of the foregoing discussion relating to the couples $C_1$ and $C_2$ acting on the crankshaft CS in FIGURE 1, it will be seen that the crankshaft 10 is substantially ideally counter weighted. Furthermore, it can easily be forged in place by the method embodied in the present invention, but it cannot be forged in place by the aforementioned Turlay method. This will be obvious when the counter weights 70 and 83 (see FIGURES 6 and 7) are examined with a view toward the die parting plane being defined by the plane 41 of throws one and four, for example. It is patently obvious that draft requirements would force the contour of the weights 70 and 83 almost into coincidence with the corresponding sets of counter weights 30, 31 and 55, 56 respectively, for example, to obtain satisfactory parting. In the alternative, the weights 70 and 83 might be made much larger to bring their undercut fan sections 88 up to the suggested parting plane 41, of course. Either solution is undesirable.

FIGURES 2–9 illustrate the method embodying features of the present invention wherein a parting plane other than one of the planes 41 or 76 is utilized. The optimum parting plane for the crankshaft 10 used here as an illustration lies at approximately forty-five degrees to each of the planes 41 and 76, and is identified by the reference numeral 90. If engine requirements, for example, require variation in counter weight contour or size from those of the present illustrative crankshaft 10, however, it is easy according to the present method to vary the angle of the parting plane relative to the planes 41 and 76 of the crank throws. In other words, the angular relationship of the crankshaft 10 to its die parting plane 90 is arbitrarily chosen as a function of counter weight contour, size, and positioning.

In the present method the crank pins 27, 67, 82 and 52 are displaced into corresponding die sections, of course; either the upper die section 91 or the lower die section 92. Correspondingly the parts of the dies at main bearings 13 and 15 which lie between counter weights 31 and 70 and between counter weights 83 and 55 are essentially equalized in height comparing the upper dies with the lower. This is an advantage because the usual close spacing of counter weights 31 and 70 and counter weights 83 and 55 results in thin die parts between the counter weights. Equalizing the heights of the die parts from the parting line to the closest point to which they join the main mass of material of the die minimizes the weakest die part and improves the overall life of the die impression compared to the Turlay method, for example, where these die parts are very unequal and have serious weakness.

Mating male and female die locks 100 and 101, respectively, are provided at each of the crank pins 27, 67, 82 and 52, as illustrated. The interior surfaces 102 of the male die locks 100 serve as die surfaces for a corresponding portion of each crank pin. The die locks 100, 101 serve to mate the dies 91 and 92, properly, of course.

The die locks 100, 101 are relatively short and shallow, respectively, as will readily be recognized. They do not, in fact, reach the center line 105 of each crank pin. A small amount of draft 106 necessarily required between the center line 105 and the top 107 of each male die lock 100, for example, is readily removed in the press setting operation or in the finish machining operation.

The male die locks 100, being relatively low, are quite sturdy. They are not prone to becoming distorted during a relatively long service life nor, for that matter, do they heat up extensively and erode rapidly.

The advantages forthcoming from this new and improved method of forging dynamically balanced crankshafts having four ninety degree displaced throws are numerous, as has been pointed out carefully in the foregoing discussions. Where only certain crankshafts could previously be formed by in place forging methods, and even those crankshafts not produced in their optimum form, the present method and die arrangement permits the forming of virtually any ninety degree displaced, four throw crankshaft.

Though the present method has been illustrated with a six counter weight crankshaft, it should be understood that it applies equally as well where more or less are used. Additional counter weights are sometimes used outside of the outer main bearings, for example, as well as in other positions.

I claim:

1. A method of forming a dynamically balanced crankshaft having ninety degree displaced throws, comprising the steps of; forging the crankshaft in position with the planes of each of its throws inclined to the parting plane of the forging dies.

2. The method of claim 1 further characterized by forging the crankshaft in position with the plane of an opposed pair of its throws inclined at an angle of between about fifteen degrees and about fifty-five degrees to the parting plane.

3. A method of forming a dynamically balanced crankshaft having four ninety degree displaced throws, comprising the steps of; forging the crankshaft in position in a single operation with the force vector line of any of its number two and three throw counter weights extending at an angle of at least about thirty degrees from the force vector line of the counter weight means that lie between the outer main bearings and the outer pins.

4. The method of claim 3 further characterized by forging the crankshaft in position with the planes of each of its throws inclined to the parting plane of the forging dies.

5. A method of forming a dynamically balanced crankshaft having an even number of throws, each of said throws lying on a quadrant radial from the axis of said crankshaft, comprising: forging the crankshaft in position with a finish forging operation which leaves the plane of each of its throws inclined to the parting plane of the forging dies.

References Cited by the Examiner

UNITED STATES PATENTS

| | | | |
|---|---|---|---|
| 1,101,813 | 6/1914 | Rice | 72—356 |
| 1,403,696 | 1/1922 | Larcher | 29—6 |
| 2,683,999 | 7/1954 | Hammond | 72—478 |
| 3,129,488 | 4/1964 | Robra | 29—6 |
| 3,144,702 | 8/1964 | Wuppermann | 29—6 |

RICHARD H. EANES, JR., *Primary Examiner.*